United States Patent
Segert et al.

(10) Patent No.: US 12,523,296 B2
(45) Date of Patent: Jan. 13, 2026

(54) QUICK OPENING CLOSURE (71) Applicant: Stark Solutions, LLC, Conroe, TX (US)

(72) Inventors: Andreas R. Segert, Conroe, TX (US); Morgan M. Sledd, Conroe, TX (US); Jarrod S. Robertson, Montgomery, TX (US)

(73) Assignee: Stark Solutions, LLC, Conroe, TX (US)

( * ) Notice: Subject to any disclaimer, the term of this patent is extended or adjusted under 35 U.S.C. 154(b) by 0 days.

(21) Appl. No.: 18/629,252

(22) Filed: Apr. 8, 2024

(65) Prior Publication Data

US 2025/0314297 A1    Oct. 9, 2025

(51) Int. Cl.
*F16J 13/20* (2006.01)
*E05B 17/00* (2006.01)
*E06B 5/00* (2006.01)

(52) U.S. Cl.
CPC .......... *F16J 13/20* (2013.01); *E05B 17/0033* (2013.01); *E06B 5/00* (2013.01)

(58) Field of Classification Search
CPC .... F16J 13/20; F16J 13/16; F16J 13/18; F16J 13/24; B01L 1/02; E05B 65/001; E05B 65/0042; E05B 65/0075; B64C 1/1423; B64C 1/143

See application file for complete search history.

(56) References Cited

U.S. PATENT DOCUMENTS

| | | | |
|---|---|---|---|
| 2,721,094 A * | 10/1955 | Webster | F16J 13/10 292/256.69 |
| 2,743,034 A | 4/1956 | Wheatley | |
| 2,771,096 A | 11/1956 | Nooy | |
| 3,349,947 A | 10/1967 | Zumwalt | |
| 3,458,083 A | 7/1969 | Erwin, Jr. | |
| 3,548,881 A | 12/1970 | Pavan | |
| 3,672,715 A | 6/1972 | Carson | |
| 3,748,785 A * | 7/1973 | Craig | F16J 13/16 49/394 |
| 3,766,947 A | 10/1973 | Osburn | |
| 4,077,250 A | 3/1978 | Wesch | |

(Continued)

FOREIGN PATENT DOCUMENTS

GB          2139694 A  * 11/1984 ............... F16J 13/20

*Primary Examiner* — Daniel J Troy
*Assistant Examiner* — Susan M. Heschel
(74) *Attorney, Agent, or Firm* — Quisenberry Law PLLC; C. Dale Quisenberry (57) ABSTRACT

Improved quick opening closures are disclosed. The closures may include a hub and a door hingedly attached to the hub by hinge arms. A seal is disposed around the door. The hinge arms may be mounted to door blocks that are attached to and substantially centered on the door. At least one support post may be connected between the hinge arms. An activation bar may be pivotally connected to a support post, such as with a pivot bracket. The activation bar is used to evenly apply closing force to the door through the centralized hinge blocks to evenly compress the seal between the door and the hub. The activation bar may also be used to pull the door out of engagement with the hub toward its open position. Various devices may connect a distal end of the activation bar to the hub to assist in opening/closing the door.

20 Claims, 8 Drawing Sheets

(56) References Cited

U.S. PATENT DOCUMENTS

| | | | |
|---|---|---|---|
| 4,140,240 A | 2/1979 | Platts | |
| 4,237,936 A | 12/1980 | Lollis et al. | |
| 4,315,577 A * | 2/1982 | Bernson, Jr. | B01J 3/03 292/256.65 |
| 4,444,331 A | 4/1984 | Lankston | |
| 7,051,897 B2 * | 5/2006 | McGuire | B01J 3/03 292/256.65 |
| 9,097,346 B1 * | 8/2015 | Rowland | F16J 13/20 |
| 10,107,402 B2 * | 10/2018 | Euwer | F16K 1/205 |
| 2004/0004081 A1 | 1/2004 | McGuire | |
| 2004/0056031 A1 | 3/2004 | McGuire | |
| 2005/0247711 A1 | 11/2005 | White et al. | |
| 2008/0296302 A1 | 12/2008 | Guidry, Jr. | |
| 2009/0145904 A1 | 6/2009 | Guidry, Jr. | |
| 2010/0025404 A1 | 2/2010 | Mehta et al. | |
| 2010/0072204 A1 | 3/2010 | Smith et al. | |
| 2011/0192848 A1 | 8/2011 | Lollis et al. | |

\* cited by examiner

QUICK OPENING CLOSURE

BACKGROUND OF THE INVENTIONS

1. Field of the Inventions

The present inventions generally relate to access doors for pipelines and pressure vessels, and more particularly to quick opening closures.

2. Description of the Related Art

It is well known in the oil and gas industry that quick opening closures are access doors designed for providing access to and for sealing pipelines and pressure vessels. Quick opening closures come in a variety of sizes from relatively small to quite large. For larger quick opening closures, due to the size and weight of the quick opening closure, it can be difficult for one person to open and close the quick opening closure without assistance. Generally the assistance is required to engage the sealing element of the closure.

As will become apparent from the description and explanation set forth below, the present inventions address the above-described problem by providing improved hinging for quick opening closures to ensure that they can be operated by one person without assistance while still engaging the sealing element.

SUMMARY OF THE INVENTIONS

In one aspect, the present inventions may include a quick opening closure comprising: a circular hub having an upper hinge block and a lower hinge block; a circular door having a vertical center axis; an upper door block attached to the circular door and substantially centered on the vertical center axis; a lower door block attached to the circular door and substantially centered on the vertical center axis; an upper hinge arm having a first end and a second end, the first end being pivotally mounted to the upper hinge block and the second end mounted to the upper door block; a lower hinge arm having a first end and a second end, the first end being pivotally mounted to the lower hinge block and the second end being mounted to the lower door block; a first support post connected to the upper hinge arm and to the lower hinge arm; and an activation bar pivotally mounted to the support post and moveable between a first position and a second position. Another feature of this aspect of the present inventions may be that the closure may further include a pivot bracket connected to the first support post, and the activation bar is pivotally connected to the pivot bracket. Another feature of this aspect of the present inventions may be that the pivot bracket includes at least one stopping surface for stopping the activation bar when moving from its first position to its second position at a substantially vertical orientation. Another feature of this aspect of the present inventions may be that the at least one stopping surface has a shape corresponding to a shape of the activation bar. Another feature of this aspect of the present inventions may be that the closure may further include an upper block bolt and a lower block bolt, the upper block bolt connecting the second end of the upper hinge arm to the upper door block, and the lower block bolt connecting the second end of the lower hinge arm to the lower door block. Another feature of this aspect of the present inventions may be that a longitudinal axis of the upper block bolt is substantially centered on the vertical central axis of the door, and a longitudinal axis of the lower block bolt is substantially centered on the vertical central axis of the door. Another feature of this aspect of the present inventions may be that the first support post is positioned in generally perpendicular relationship to the upper hinge arm and the lower hinge arm, is connected to the upper hinge arm between the first and second ends of the upper hinger arm, and is connected to the lower hinge arm between the first and second ends of the lower hinge arm. Another feature of this aspect of the present inventions may be that the closure may further include a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position. Another feature of this aspect of the present inventions may be that the closure may further include a winch having a first connector adapted for releasable engagement with a distal end of the activation bar and a second connector adapted for releasable engagement with the hub, and the winch is adapted to pull the door into a closed position relative to the hub. Another feature of this aspect of the present inventions may be that the closure may further include a second support post connected to the upper hinge arm and to the lower hinge arm, the second support post being positioned between the first support post and the second ends of the upper and lower hinge arms, and the second support post being positioned in generally parallel relationship to the first support post.

In another aspect, the present inventions may include a quick opening closure comprising: a circular hub having an upper hinge block and a lower hinge block; a circular door having a vertical center axis; an upper door block attached to the circular door and substantially centered on the vertical center axis; a lower door block attached to the circular door and substantially centered on the vertical center axis; an upper hinge arm having a first end and a second end, the first end being pivotally mounted to the upper hinge block and the second end mounted to the upper door block; a lower hinge arm having a first end and a second end, the first end being pivotally mounted to the lower hinge block and the second end being mounted to the lower door block; a first support post connected to the upper hinge arm and to the lower hinge arm; a pivot bracket connected to the first support post; and an activation bar pivotally mounted to the pivot bracket and moveable between a first position and a second position. Another feature of this aspect of the present inventions may be that the pivot bracket includes at least one stopping surface for stopping the activation bar when moving from its first position to its second position at a substantially vertical orientation, and the at least one stopping surface has a shape corresponding to a shape of the activation bar. Another feature of this aspect of the present inventions may be that the closure may further include an upper block bolt and a lower block bolt, the upper block bolt connecting the second end of the upper hinge arm to the upper door block, and the lower block bolt connecting the second end of the lower hinge arm to the lower door block, wherein a longitudinal axis of the upper block bolt is substantially centered on the vertical central axis of the door, and a longitudinal axis of the lower block bolt is substantially centered on the vertical central axis of the door. Another feature of this aspect of the present inventions may be that the closure may further include a second support post, wherein the first and second support posts are positioned in generally perpendicular relationship to the upper hinge arm and the lower hinge arm, the first support post is connected to the upper hinge arm between the first and second ends of the upper hinger arm and to the lower hinge arm between the first and second ends of the lower hinge arm, and the second support post is positioned between the first support post and the second ends of the upper and lower hinge arms, and in generally parallel relationship to the first support post. Another feature of this aspect of the present inventions may be that the closure may further include a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position. Another feature of this aspect of the present inventions may be that the closure may further include a winch having a first connector adapted for releasable engagement with a distal end of the activation bar and a second connector adapted for releasable engagement with the hub, and the winch is adapted to pull the door into a closed position relative to the hub.

In yet another aspect, the present inventions may include a quick opening closure comprising: a circular hub having an upper hinge block and a lower hinge block; a circular door having a vertical center axis; an upper door block attached to the circular door and substantially centered on the vertical center axis; a lower door block attached to the circular door and substantially centered on the vertical center axis; an upper hinge arm having a first end and a second end, the first end being pivotally mounted to the upper hinge block and the second end mounted to the upper door block; a lower hinge arm having a first end and a second end, the first end being pivotally mounted to the lower hinge block and the second end being mounted to the lower door block; an upper block bolt and a lower block bolt, the upper block bolt connecting the second end of the upper hinge arm to the upper door block, and the lower block bolt connecting the second end of the lower hinge arm to the lower door block, wherein a longitudinal axis of the upper block bolt is substantially centered on the vertical central axis of the door, and a longitudinal axis of the lower block bolt is substantially centered on the vertical central axis of the door; a first support post connected to the upper hinge arm and to the lower hinge arm; a pivot bracket connected to the first support post; and an activation bar pivotally mounted to the pivot bracket and moveable between a first position and a second position, wherein the pivot bracket includes at least one stopping surface for stopping the activation bar when moving from its first position to its second position at a substantially vertical orientation, the at least one stopping surface has a shape corresponding to a shape of the activation bar; the pivot bracket further include at least one support surface for holding the activation bar in a generally horizontal orientation when in its first position. Another feature of this aspect of the present inventions may be that the closure may further include a second support post, wherein the first and second support posts are positioned in generally perpendicular relationship to the upper hinge arm and the lower hinge arm, the first support post is connected to the upper hinge arm between the first and second ends of the upper hinger arm and to the lower hinge arm between the first and second ends of the lower hinge arm, and the second support post is positioned between the first support post and the second ends of the upper and lower hinge arms, and in generally parallel relationship to the first support post. Another feature of this aspect of the present inventions may be that the closure may further include a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position. Another feature of this aspect of the present inventions may be that the closure may further include a winch having a first connector adapted for releasable engagement with a distal end of the activation bar and a second connector adapted for releasable engagement with the hub, and the winch is adapted to pull the door into a closed position relative to the hub.

Other features, aspects and advantages of the present inventions will become apparent from the following discussion and detailed description.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Figure 1:
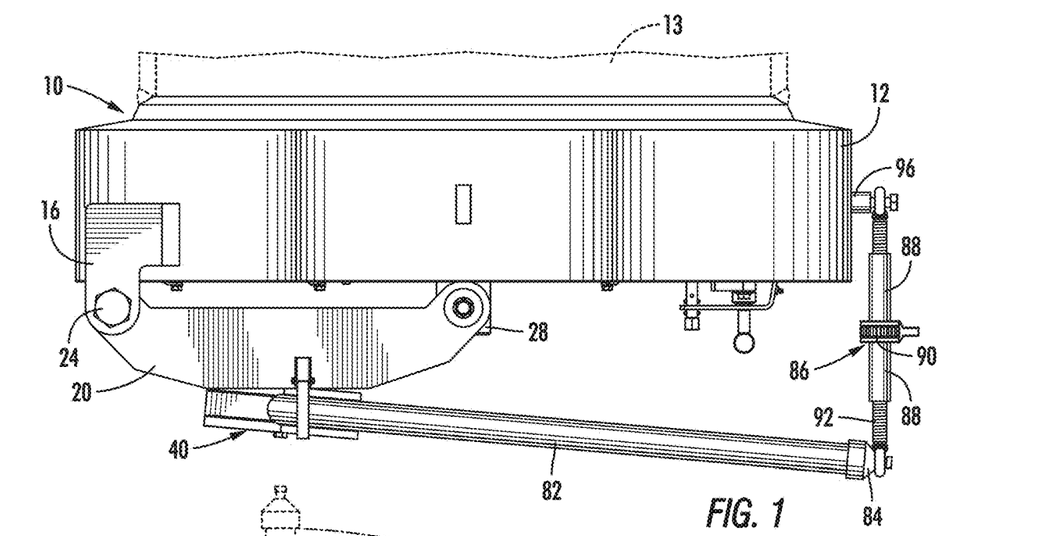
FIG. 1 is a top view a specific embodiment of a quick opening closure constructed in accordance with one aspect of the present inventions.
Figure 2:
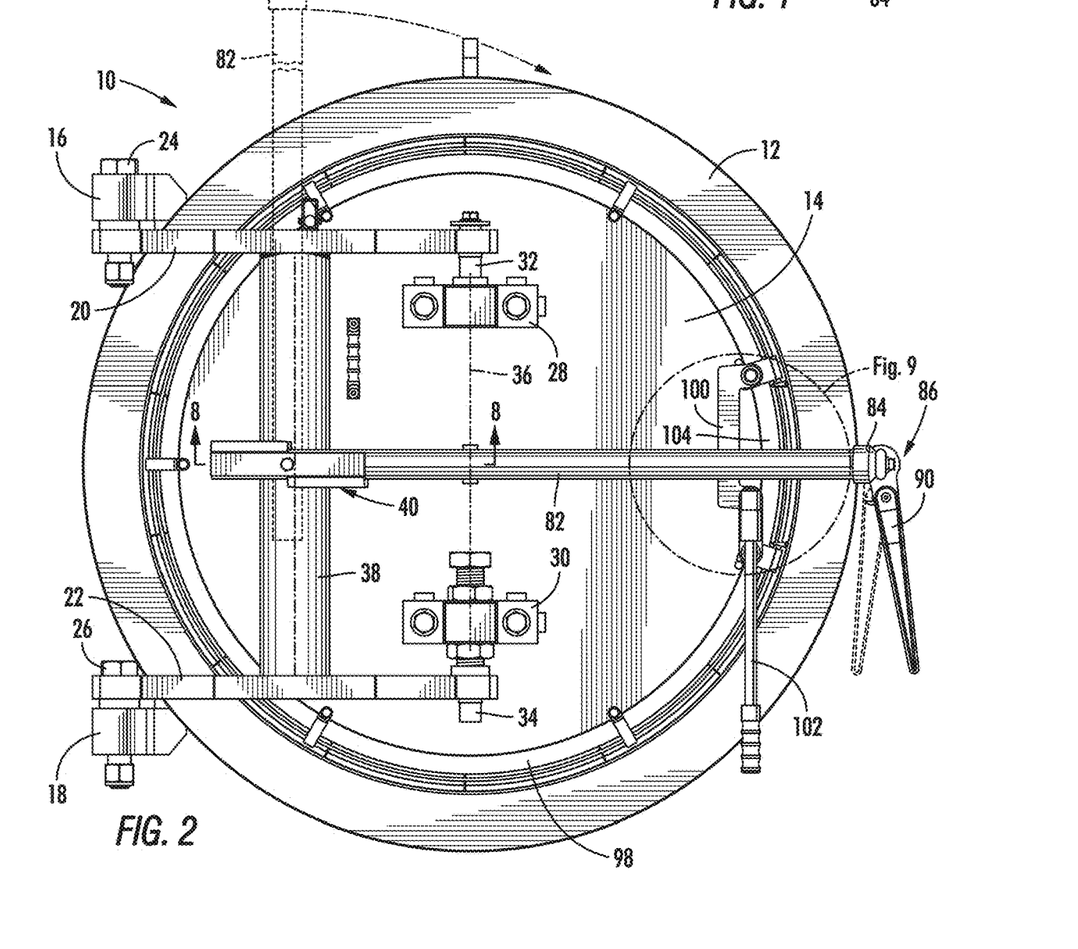
FIG. 2 is a front view of the quick opening closure shown in FIG. 1.
Figure 3:
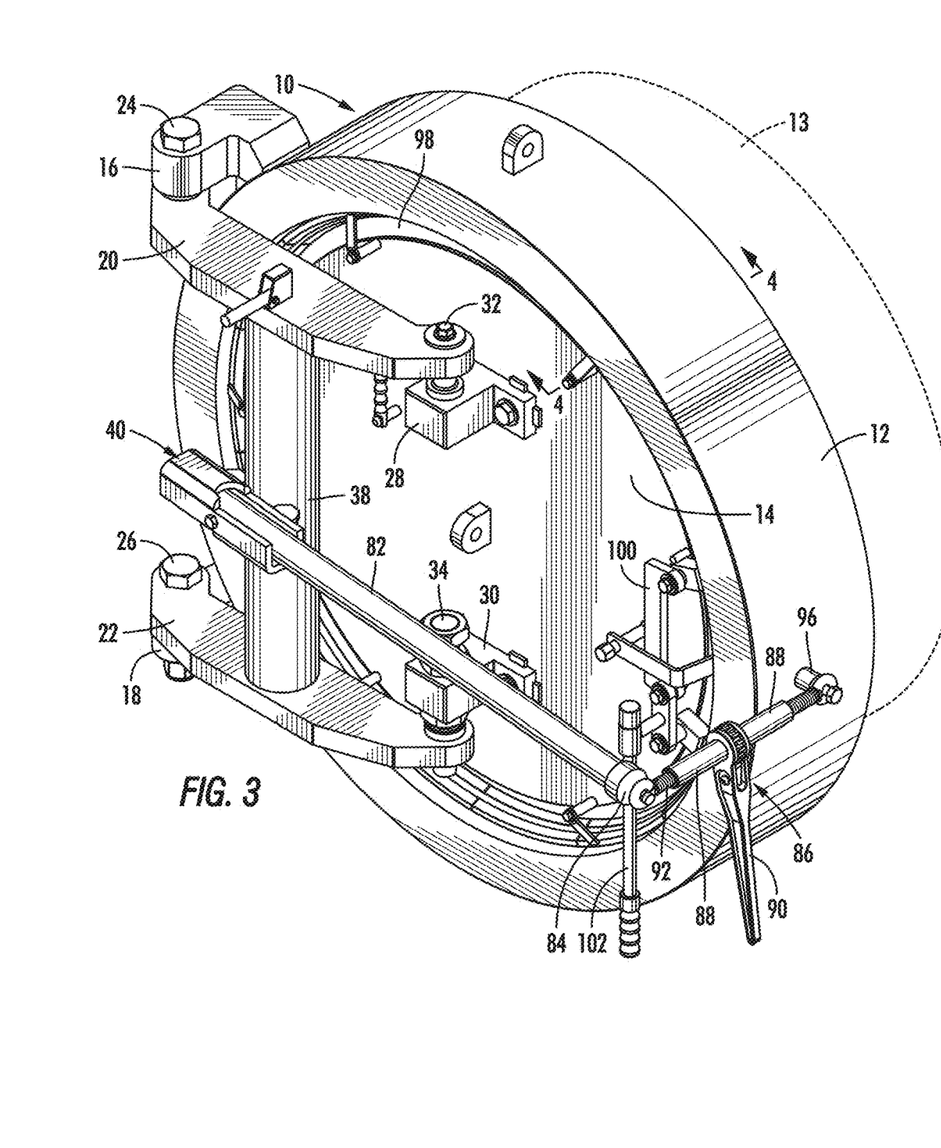
FIG. 3 is a perspective view of the quick opening closure shown in FIGS. 1 and 2.
Figure 4:
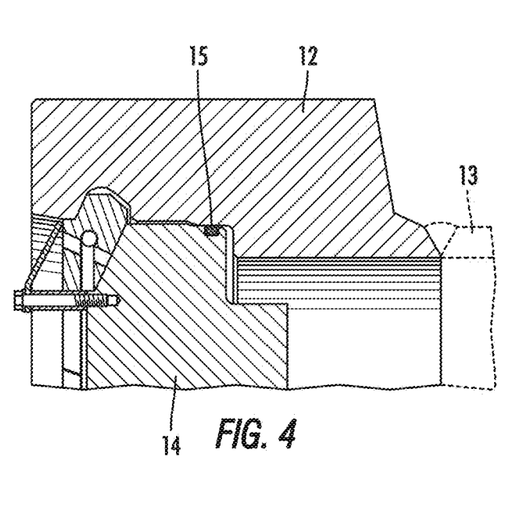
FIG. 4 is a cross-sectional view of a portion of the quick opening closure shown in FIGS. 1-3 taken along line 4-4 in FIG. 3.

Referring to the drawings in detail, wherein like numerals denote identical elements throughout the several views, and referring initially to FIGS. 1-3, there is shown a perspective view of a specific embodiment of a quick opening closure 10 including a circular hub 12 and a circular door 14. An annular seal 15 such as an O-ring is disposed around an outer surface of the door 14 for sealing the space between the hub 12 and the door 14. The quick opening closure 10 is for attachment to a pipeline or pressure chamber 13, shown in dashed lines. The hub 12 includes an upper hinge block 16 and a lower hinge block 18. A first end of an upper hinge arm 20 is pivotally connected to the upper hinge block 16 with an upper hinge bolt 24. A first end of a lower hinge arm 22 is pivotally connected to the lower hinge block 18 with a lower hinge bolt 26. A second end of the upper hinge arm 20 is pivotally connected to an upper door block 28 with an upper block bolt 32. A second end of the lower hinge arm 22 is pivotally connected to a lower door block 30 with a lower block bolt 34. The upper and lower door blocks 28 and 30 are connected to the door 14. In a specific embodiment, the upper and lower door blocks 28 and 30 are substantially centered on the door 14 on a vertical center line or axis 36 that extends vertically through the center of the door 14. In a specific embodiment, the upper and lower block bolts 32 and 34 are substantially centered on the vertical center line 36. As discussed further below, by substantially centering the door blocks 28/30 on the door 14, when force is applied to the door by mechanical means as explained below it is applied centrally to thereby evenly compress the seal 15 between the hub 12 and the door 14.

In a specific embodiment, a support post 38 is connected to and between the upper hinge arm 20 and the lower hinge arm 22. In a specific embodiment, the support post 38 is vertically disposed between the upper and lower hinge arms 20 and 22. In a specific embodiment, the support post 38 is perpendicular to the upper and lower hinge arms 20 and 22. In a specific embodiment, the support post 38 is parallel to the vertical center line 36.

Figure 5:
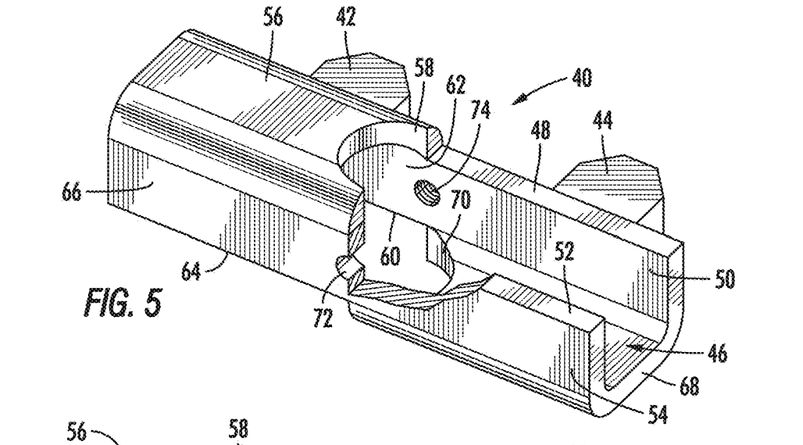
FIG. 5 is a perspective view of a pivot bracket constructed in accordance with one aspect of the present inventions, with a portion of a front wall of the pivot bracket removed to show additional details of the pivot bracket on a lower side thereof.
Figure 6:
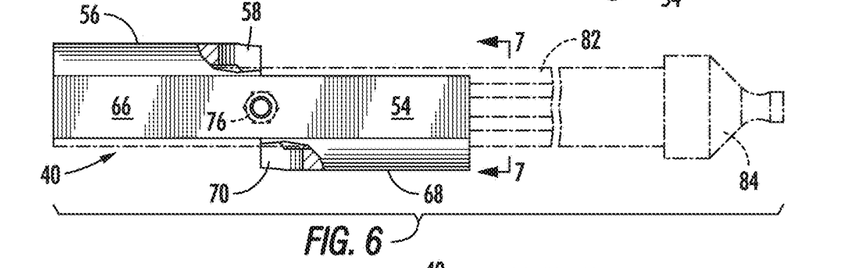
FIG. 6 is a front view of the pivot bracket shown in FIG. 5 with an activation bar constructed in accordance with one aspect of the present inventions shown in dashed lines in connection therewith, with portions of the front side of the pivot bracket removed to show additional details of the pivot bracket.
Figure 7:
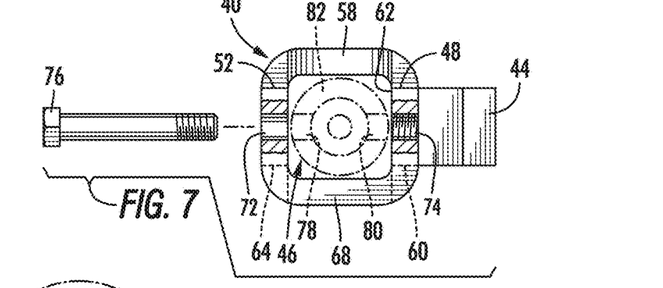
FIG. 7 is a cross-sectional end view of the pivot bracket shown in FIGS. 5 and 6, and taken along line 7-7 of FIG. 6.
Figure 8:
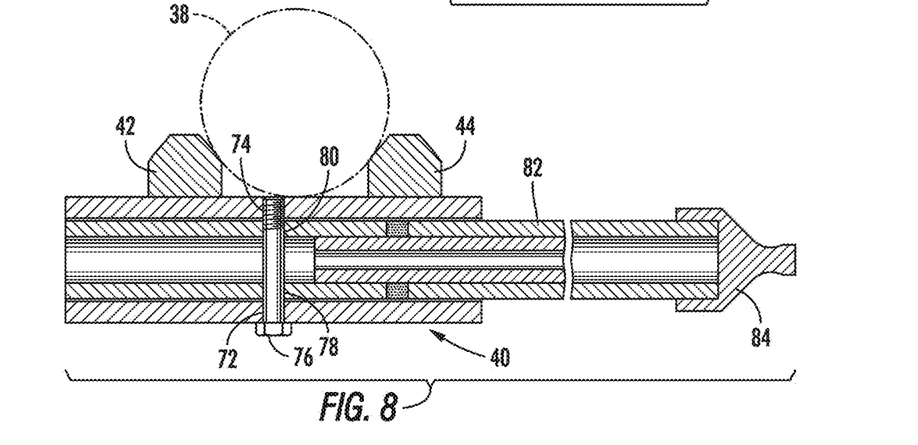
FIG. 8 is a cross-sectional top view of the pivot bracket shown in FIGS. 5-7 attached to a vertical support post, which is connected to a door that forms part of the quick opening closure shown in FIGS. 1-3.

A pivot bracket 40 is connected to the support post 38. In a specific embodiment, the pivot bracket 40 may include a first extension 42 and a second extension 44 extending from a rear wall of the pivot bracket 40. In a specific embodiment, the support post 38 may be positioned between and connected to the first and second extensions 42 and 44, such as by welding. In a specific embodiment, the pivot bracket 40 may be connected to the support post 38 at a point approximately equidistant between the upper hinge arm 20 and the lower hinge arm 22. In a specific embodiment, the pivot bracket 40 may be formed from a section of square tubing. The present inventions are not limited to any particular shape of pivot bracket 40. Other geometries of tubing are also included within the scope of the present inventions, such as circular, for example. With reference to FIG. 5, the pivot bracket 40 may include a channel 46 extending through the pivot bracket 40. An upper section of a right half of the pivot bracket 40 may be removed such as by machining, thereby defining a rear upper surface 48 of a right rear wall 50 of the pivot bracket 40, and a forward upper surface 52 of a right front wall 54. In a specific embodiment, a portion of an upper section 56 of a left half of the pivot bracket 40 may also be partially removed, such as by machining, to define an upper semi-circular surface 58. In a specific embodiment, the lower side of the pivot bracket 40 may be an inverted mirror image of the upper side of the pivot bracket 40. In a specific embodiment, a lower section of a left half of the pivot bracket 40 may be removed such as by machining, thereby defining a rear lower surface 60 of a left rear wall 62 of the pivot bracket 40, and a forward lower surface 64 of a left front wall 66. In a specific embodiment, a portion of a lower section 68 of a right half of the pivot bracket 40 may also be partially removed, such as by machining, to define a lower semi-circular surface 70. The use of the terms "right" and "left" are not to be construed as limiting the scope of the present inventions. For example, the present inventions include embodiments in which the door 14 hinges from the right side of the hub 12, in which case the hinge blocks 16 and 18 would be positioned on the right side of the hub 12. In a specific embodiment such as this, the structural features of the pivot bracket 40 may be reversed, in which case the above references to "right" would be changed to "left", and the above references to "left" would be changed to "right."

A front wall of the pivot bracket 40 may include an aperture 72, which may be centered on the front wall. The rear wall of the pivot bracket 40 may include a threaded bore 74, which may be centered on the back wall, and aligned with the aperture 72. A bolt 76 may be positioned through the aperture 72 and threadably engaged with the threaded bore 74. The bolt 76 may also be positioned through aligned apertures 78 and 80 in an elongated activation bar 82. The activation bar 82 is rotatable around the bolt 76 from a first, lower, or generally horizontal position as shown in FIG. 2 to a second, upper, or generally vertical position, as shown in dashed lines in FIG. 2. As will be discussed in more detail below, the purpose of the activation bar 82 is to provide mechanical assistance to a user in opening and closing the door 14, and, more specifically, to compress the annular seal or O-ring 15 around an outer surface of the door 14 between the door 14 and an inner surface of the circular hub 12. As mentioned above, in a specific embodiment, by substantially centering the door blocks 28/30 on the door 14, when the activation bar 82 is used to close the door 14 and apply compressive force to the seal 15, it will do so evenly so that the seal 15 is evenly compressed between the hub 12 and the door 14. In a specific embodiment, as discussed below, mechanical assistance to apply closing force to the activation bar 82 may be accomplished by connecting an extendable/retractable fastener between a distal end 84 of the activation bar 82 and circular hub 12.

In a specific embodiment, as shown in FIGS. 1-3, a rachet assembly 86 may include a ratchet body 88 connected to a ratchet arm 90. The ratchet body 88 may include a first threaded rod 92 extending from a first end of the body 88, and a second threaded rod 94 extending from a second end of the body 88. A distal end of the first threaded rod 92 is connected to the distal end of the activation bar 82. A distal end of the second threaded rod 94 is connected to a stud 96 that is attached to an exterior surface of the hub 12. The ratchet assembly 86 can be used in a known manner to pull the activation rod 82 closer to the hub 12 when the door 14 is being closed (and to compress the seal/O-ring 15), and also to push the activation rod 82 away from the hub 12 when the door 14 is being opened.

Figure 9:
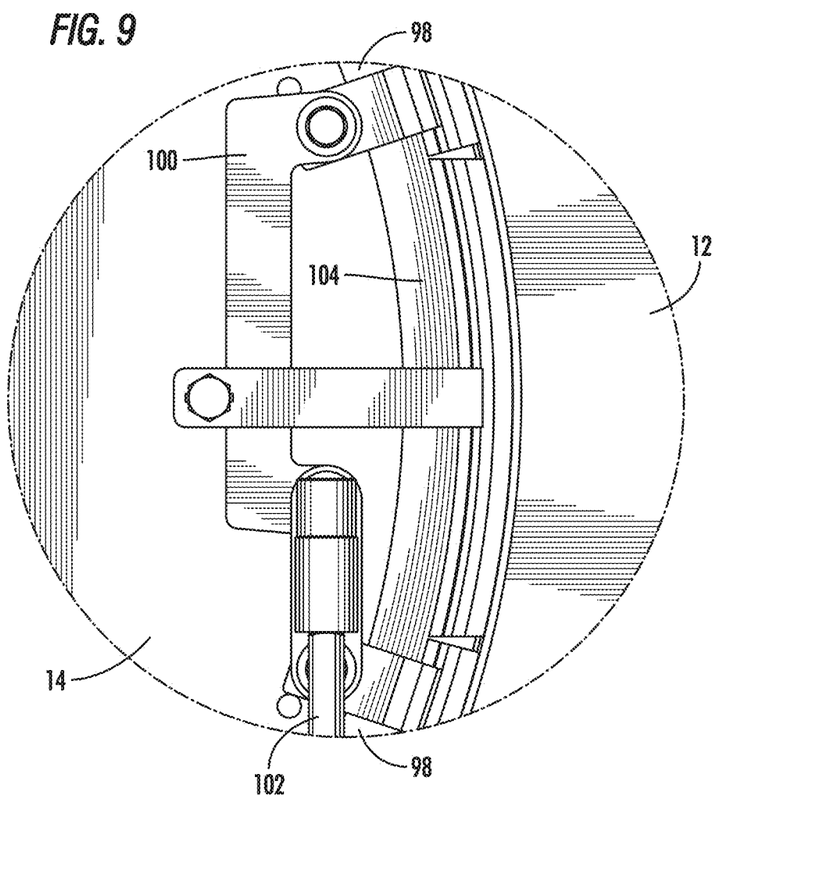
FIG. 9 is an enlarged view of the portion of FIG. 2 designated as FIG. 9.
Figure 10:
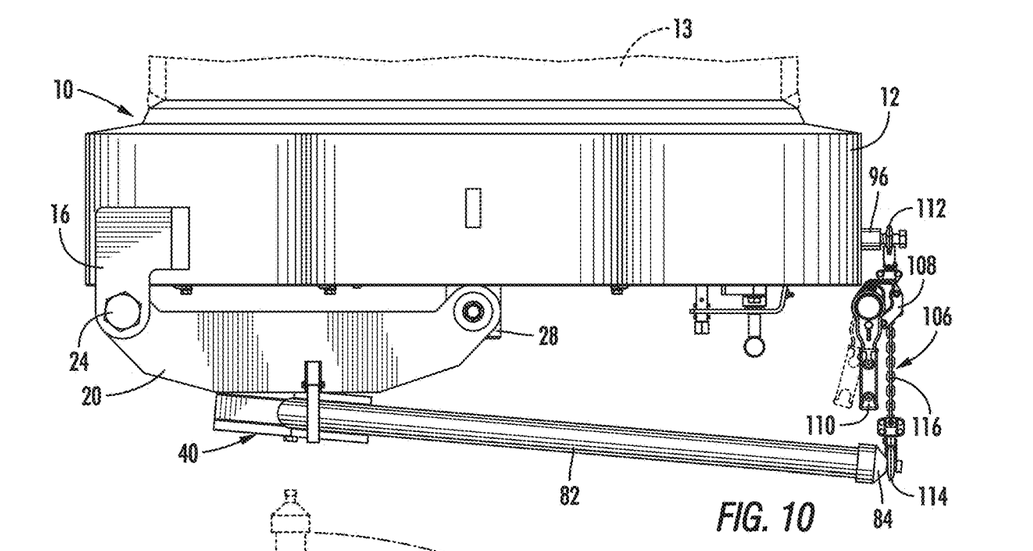
FIG. 10 is a top view of another specific embodiment of a quick opening closure constructed in accordance with another aspect of the present inventions.
Figure 11:
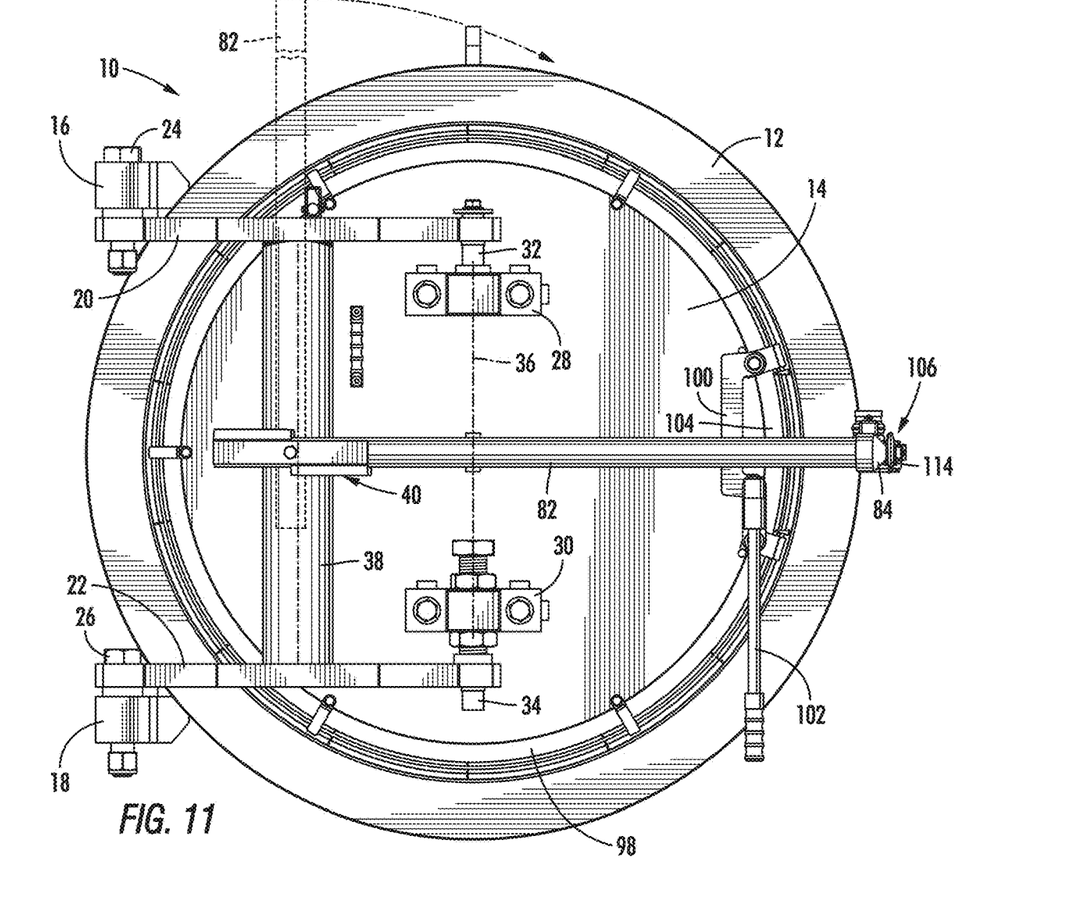
FIG. 11 is a front view of the quick opening closure shown in FIG. 10.
Figure 12:
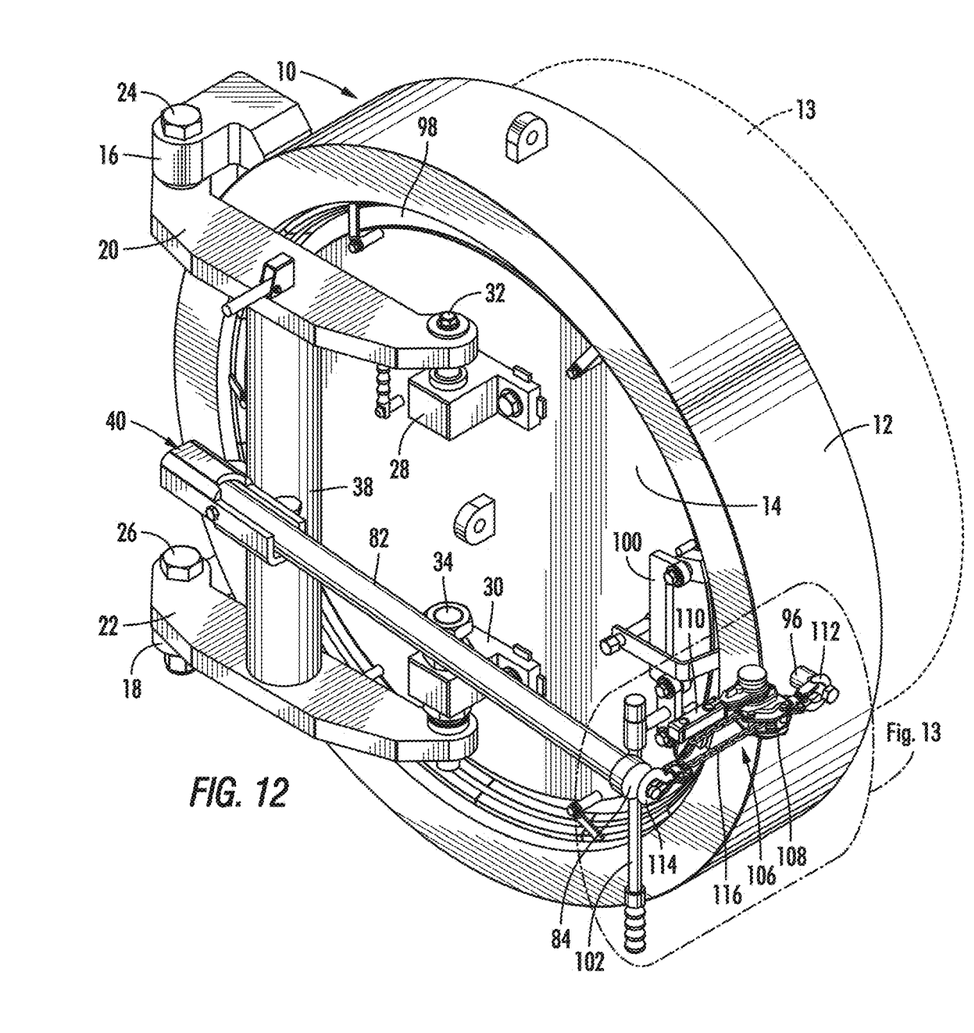
FIG. 12 is a perspective view of the quick opening closure shown in FIGS. 10 and 11.
Figure 13:
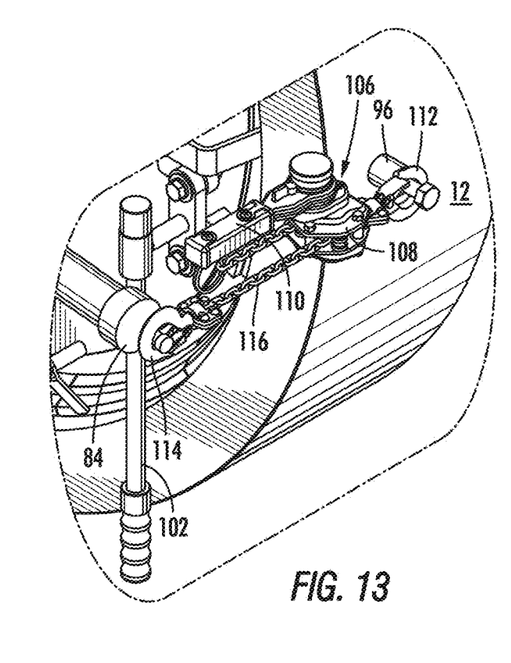
FIG. 13 is an enlarged view of the portion of FIG. 12 designated as FIG. 13.
Figure 14:
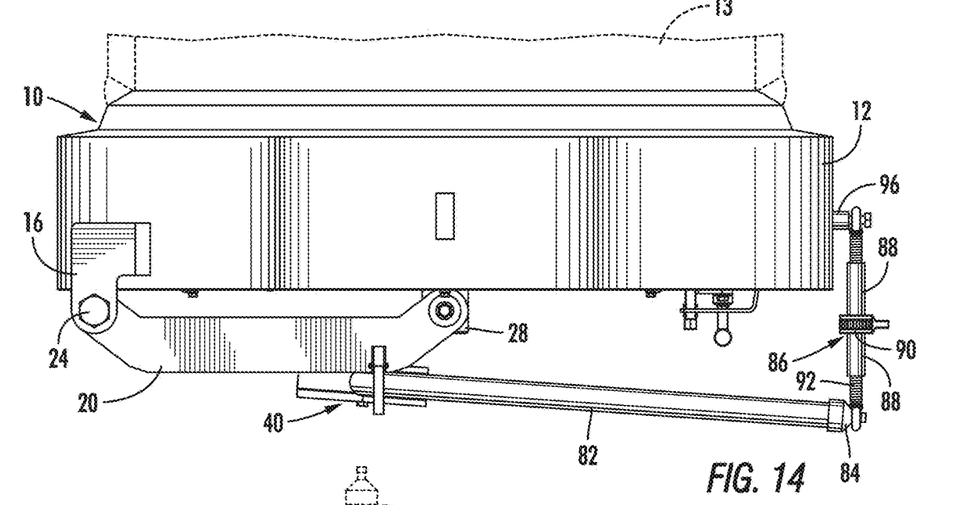
FIG. 14 is a top view of another specific embodiment of a quick opening closure constructed in accordance with another aspect of the present inventions.
Figure 15:
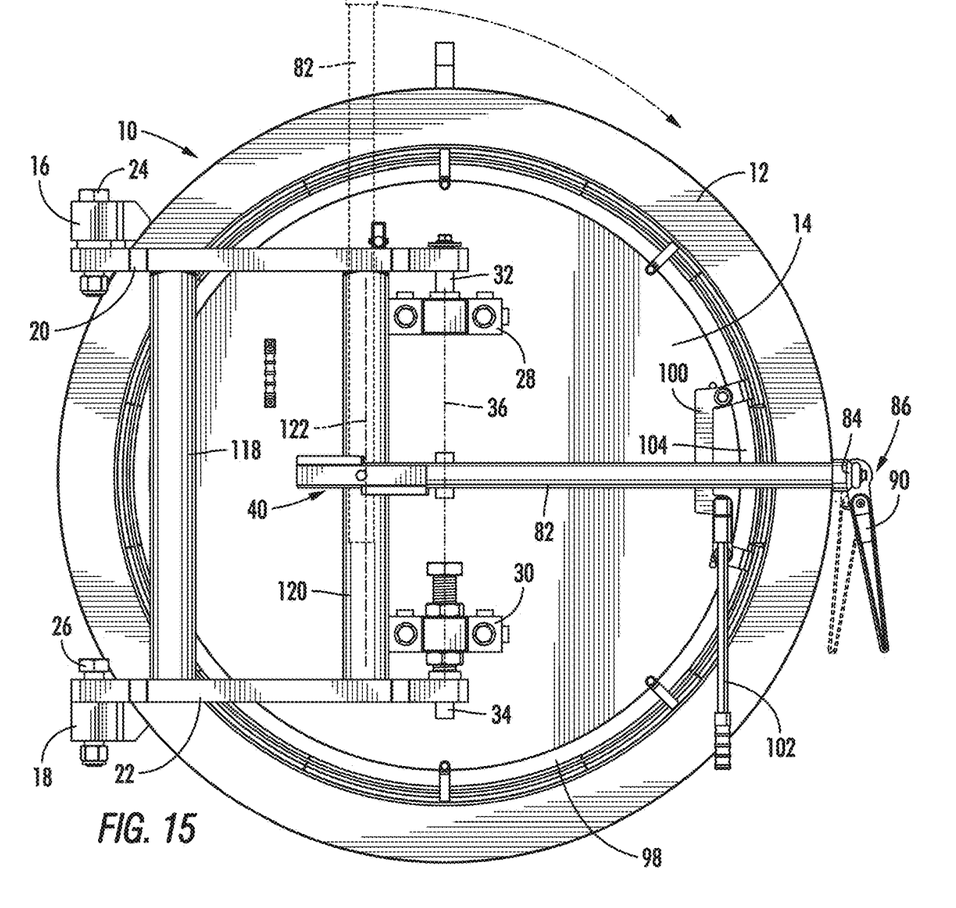
FIG. 15 is a front view of the quick opening closure shown in FIG. 14.
Figure 16:
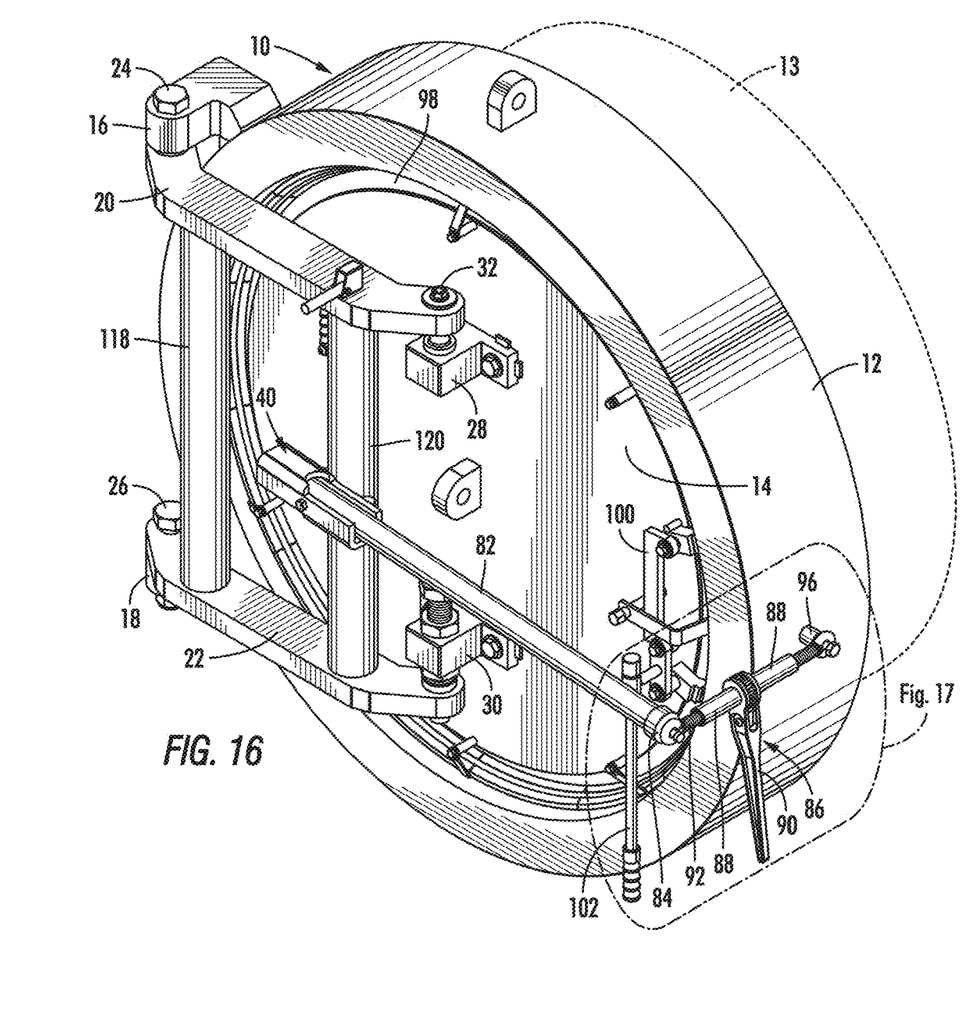
FIG. 16 is a perspective view of the quick opening closure shown in FIGS. 14 and 15.
Figure 17:
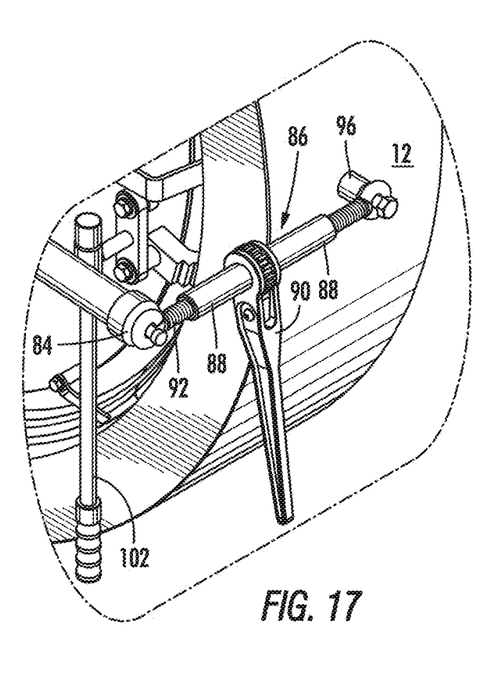
FIG. 17 is an enlarged view of the portion of FIG. 16 designated as FIG. 17.

With reference to FIGS. 2 and 9, the quick opening closure 10 may also include an internal locking ring 98 that is released when it is desired to open the door 14 and is engaged once the door 14 has been pushed in to its closed and sealed position. A ring connector 100 connects the opposed ends of the internal locking ring 98. A ring handle 102 is connected to the ring connector 100, and adapted for rotatable movement between a locked position, as shown in FIGS. 2 and 9, and an unlocked position. A removable arcuate ring block 104 is adapted for placement in the open space between the opposed ends of the C-shaped locking ring 98. The ring block 104 is shown in its installed position between the opposed ends of the locking ring 98 in FIGS. 2 and 9, at which time the door 14 is in its closed and sealed position. When it is desired to open the door 14, the ring handle 102 is rotated to its unlocked position, which releases the ring connector 100 and the locking ring 98, and frees up tension on the ring block 104 so it can be removed. The ratchet assembly 86 can then be cranked to push the door 14 away from the hub 12. Once the door 14 is partially opened, the ratchet assembly 86 can be disconnected from the quick opening closure 10. The user can then pull the activation bar 82 to pull the door 14 to its fully open position, at which time the activation bar 82 can be rotated up and out of the way into its generally vertical position, as shown in dashed lines in FIG. 2. In a specific embodiment, when the activation bar 82 is in this position, it is prevented from rotating any further to the left since the left side of the activation bar 82 will come into contact with the upper semi-circular surface 58 on pivot bracket 40 and the right side of the activation bar 82 will come into contact with the lower semi-circular surface 70 on the pivot bracket 40. It is noted that the present inventions are not limited to the use of semi-circular surfaces 58 and 70 to act as stops to prevent further rotation of the activation bar 82 to the left; in specific embodiments where this is a desired feature, other mechanical structures may be used without departing from the scope of the present inventions.

Referring now to FIGS. 10-13, another specific embodiment of a quick opening closure 10 is shown. The basic structure and operation of the quick opening closure 10 shown in FIGS. 10-13 is the same as for the embodiment shown in FIGS. 1-9, except with respect to the extendable/retractable fastener. Instead of a ratchet assembly 86, in this embodiment, the quick opening enclosure 10 is provided with a winch 106, sometimes referred to as a "come along." The winch 106 may include a frame 108 having a ratchet connected to a handle 110. A first hook 112 is connected to a first end of the frame 108, and adapted for releasable engagement with the stud 96 on the exterior surface of the door frame 12. A second hook 114 is connected via a chain 116 to a second end of the frame 108. The second hook is adapted for releasable engagement with the distal end 84 of the activation bar 82. The winch 106 can be used in a known manner to pull the activation rod 82 closer to the door frame 12 when the door 14 is being closed (and to compress the seal/O-ring 15). Unlike with the ratchet assembly 86 discussed above, the winch 106 can only be used to close the door 14.

Referring now to FIGS. 14-17, another specific embodiment of a quick opening closure 10 is shown. The only difference between this embodiment and the prior embodiments is that this embodiment includes two support posts, namely, a first or left support post 118 and a second or right support post 120, instead of just a single support post, i.e., support post 38, as shown in FIGS. 1-13 and discussed above. This embodiment is believed to be more suitable for larger applications, where the quick opening closure 10 is for use with larger diameter pipelines and larger pressure vessels. In this embodiment, the first or left support post 118 is positioned closer to the left side of the upper and lower hinge arms 20 and 22, and the second or right support post 12 is positioned closer to the center of the door 14. In this specific embodiment, the quick opening closure 10 is shown with a ratchet assembly 86, but could also be provided instead with a winch 106, or any other extendable/retractable fastener.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A quick opening closure comprising:
   a circular hub having an upper hinge block and a lower hinge block;
   a circular door having a vertical center axis;
   an upper door block attached to the circular door and substantially centered on the vertical center axis;
   a lower door block attached to the circular door and substantially centered on the vertical center axis;
   an upper hinge arm having a first end and a second end, the first end being pivotally mounted to the upper hinge block and the second end mounted to the upper door block;
   a lower hinge arm having a first end and a second end, the first end being pivotally mounted to the lower hinge block and the second end being mounted to the lower door block;
   a first support post fixed directly to the upper hinge arm and to the lower hinge arm; and
   an activation bar pivotally mounted to the support post and moveable between a first position and a second position.

2. The quick opening closure of claim 1, further including a pivot bracket connected to the first support post, and the activation bar is pivotally connected to the pivot bracket.

3. The quick opening closure of claim 2, wherein the pivot bracket includes at least one stopping surface for stopping the activation bar when moving from its first position to its second position at a substantially vertical orientation.

4. The quick opening closure of claim 3, wherein the at least one stopping surface has a shape corresponding to a shape of the activation bar.

5. The quick opening closure of claim 1, further including an upper block bolt and a lower block bolt, the upper block bolt connecting the second end of the upper hinge arm to the upper door block, and the lower block bolt connecting the second end of the lower hinge arm to the lower door block.

6. The quick opening closure of claim 5, wherein a longitudinal axis of the upper block bolt is substantially centered on the vertical central axis of the door, and a longitudinal axis of the lower block bolt is substantially centered on the vertical central axis of the door.

7. The quick opening closure of claim 1, wherein the first support post is positioned in generally perpendicular relationship to the upper hinge arm and the lower hinge arm, is connected to the upper hinge arm between the first and second ends of the upper hinge arm, and is connected to the lower hinge arm between the first and second ends of the lower hinge arm.

8. The quick opening closure of claim 1, further including a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position.

9. The quick opening closure of claim 1, further including a winch having a first connector adapted for releasable engagement with a distal end of the activation bar and a second connector adapted for releasable engagement with the hub, and the winch is adapted to pull the door into a closed position relative to the hub.

10. The quick opening closure of claim 1, further including a second support post connected to the upper hinge arm and to the lower hinge arm, the second support post being positioned between the first support post and the second ends of the upper and lower hinge arms, and the second support post being positioned in generally parallel relationship to the first support post.

11. A quick opening closure comprising:
a circular hub having an upper hinge block and a lower hinge block;
a circular door having a vertical center axis;
an upper door block attached to the circular door and substantially centered on the vertical center axis;
a lower door block attached to the circular door and substantially centered on the vertical center axis;
an upper hinge arm having a first end and a second end, the first end being pivotally mounted to the upper hinge block and the second end mounted to the upper door block;
a lower hinge arm having a first end and a second end, the first end being pivotally mounted to the lower hinge block and the second end being mounted to the lower door block;
a first support post fixed directly to the upper hinge arm and to the lower hinge arm;
a pivot bracket connected to the first support post; and
an activation bar pivotally mounted to the pivot bracket and moveable between a first position and a second position.

12. The quick opening closure of claim 11, wherein the pivot bracket includes at least one stopping surface for stopping the activation bar when moving from its first position to its second position at a substantially vertical orientation, and the at least one stopping surface has a shape corresponding to a shape of the activation bar.

13. The quick opening closure of claim 11, further including an upper block bolt and a lower block bolt, the upper block bolt connecting the second end of the upper hinge arm to the upper door block, and the lower block bolt connecting the second end of the lower hinge arm to the lower door block, wherein a longitudinal axis of the upper block bolt is substantially centered on the vertical central axis of the door, and a longitudinal axis of the lower block bolt is substantially centered on the vertical central axis of the door.

14. The quick opening closure of claim 11, further including a second support post, wherein the first and second support posts are positioned in generally perpendicular relationship to the upper hinge arm and the lower hinge arm, the first support post is connected to the upper hinge arm between the first and second ends of the upper hinge arm and to the lower hinge arm between the first and second ends of the lower hinge arm, and the second support post is positioned between the first support post and the second ends of the upper and lower hinge arms, and in generally parallel relationship to the first support post.

15. The quick opening closure of claim 11, further including a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position.

16. The quick opening closure of claim 11, further including a winch having a first connector adapted for releasable engagement with a distal end of the activation bar and a second connector adapted for releasable engagement with the hub, and the winch is adapted to pull the door into a closed position relative to the hub.

17. A quick opening closure comprising:
a circular hub having an upper hinge block and a lower hinge block;
a circular door having a vertical center axis;
an upper door block attached to the circular door and substantially centered on the vertical center axis;
a lower door block attached to the circular door and substantially centered on the vertical center axis;
an upper hinge arm having a first end and a second end, the first end being pivotally mounted to the upper hinge block and the second end mounted to the upper door block;
a lower hinge arm having a first end and a second end, the first end being pivotally mounted to the lower hinge block and the second end being mounted to the lower door block;
an upper block bolt and a lower block bolt, the upper block bolt connecting the second end of the upper hinge arm to the upper door block, and the lower block bolt connecting the second end of the lower hinge arm to the lower door block, wherein a longitudinal axis of the upper block bolt is substantially centered on the vertical central axis of the door, and a longitudinal axis of the lower block bolt is substantially centered on the vertical central axis of the door,
a first support post fixed directly to the upper hinge arm and to the lower hinge arm;

a pivot bracket connected to the first support post; and an activation bar pivotally mounted to the pivot bracket and moveable between a first position and a second position, wherein the pivot bracket includes at least one stopping surface for stopping the activation bar when moving from its first position to its second position at a substantially vertical orientation, the at least one stopping surface has a shape corresponding to a shape of the activation bar, the pivot bracket further including at least one support surface for holding the activation bar in a generally horizontal orientation when in its first position.

18. The quick opening closure of claim 17, further including a second support post, wherein the first and second support posts are positioned in generally perpendicular relationship to the upper hinge arm and the lower hinge arm, the first support post is connected to the upper hinge arm between the first and second ends of the upper hinge arm and to the lower hinge arm between the first and second ends of the lower hinge arm, and the second support post is positioned between the first support post and the second ends of the upper and lower hinge arms, and in generally parallel relationship to the first support post.

19. The quick opening closure of claim 17, further including a ratchet body having a ratchet body supporting a ratchet arm, a first threaded rod, and a second threaded rod, wherein a distal end of the first threaded rod is adapted for removeable engagement with a distal end of the activation bar, and a distal end of the second threaded rod is adapted for removable engagement with the hub, and the ratchet arm is adapted to be used to pull the door into a closed position relative to the hub and push the door toward an open position.

20. The quick opening closure of claim 17, further including a winch having a first connector adapted for releasable engagement with a distal end of the activation bar and a second connector adapted for releasable engagement with the hub, and the winch is adapted to pull the door into a closed position relative to the hub.

\* \* \* \* \*